UNITED STATES PATENT OFFICE.

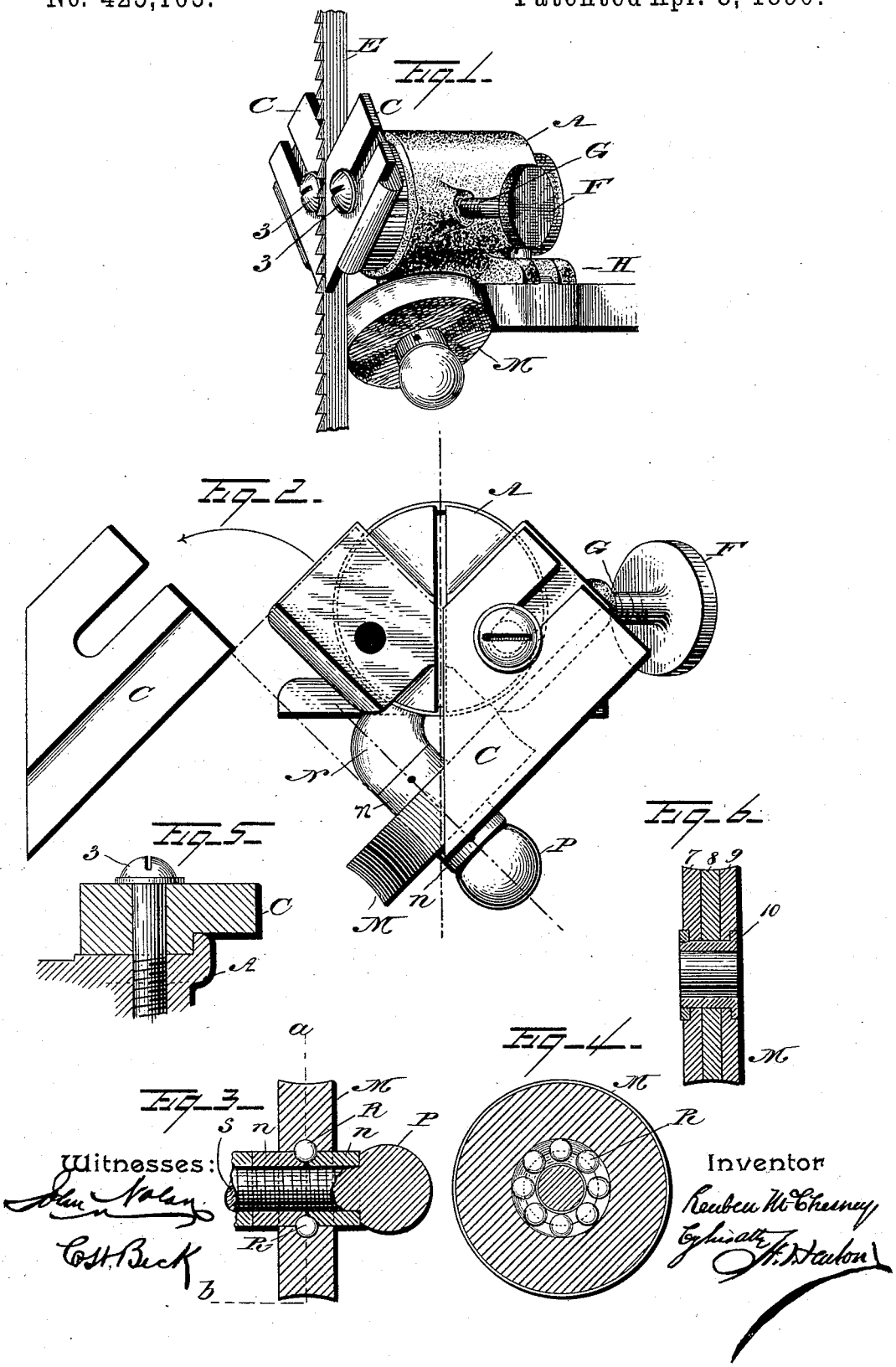

REUBEN McCHESNEY, OF PHILADELPHIA, PENNSYLVANIA.

GUIDE FOR BAND-SAWS.

SPECIFICATION forming part of Letters Patent No. 425,105, dated April 8, 1890.

Application filed November 6, 1889. Serial No. 329,433. (No model.)

*To all whom it may concern:*

Be it known that I, REUBEN MCCHESNEY, a citizen of the United States, residing in the city of Philadelphia, in the State of Pennsylvania, have invented certain new and useful Improvements in Guides for Band-Saws, of which the following is a full, clear, and exact description, reference being had to the accompanying drawings, forming a part of this specification.

My invention relates to guides for band-saws, and is an improvement upon the device for which Letters Patent were granted to me No. 405,110, dated June 11, 1889.

The object of my invention is to furnish a guide for endless or reciprocating saws which require to be guided in position sidewise, and also in the rear by means of a support for the back edge of the saw, and this latter guide must rotate with the movement of the saw over it in order to prevent the cutting of indentations in its peripheral surface by the back of the saw; and my present improvements consist in the combination and arrangement relatively to each other of the side guides and the back guide, of the bearings for the rotating back guide, of the construction of the rotating back guide, and of other details of the mechanism, as hereinafter described.

In the accompanying drawings illustrating my invention, Figure 1 is a perspective view showing the stock or guide block, the side guides, and the rotating back guide, with a section of the saw placed in position to show the relative arrangement of the several parts when in operation. Fig. 2 is a front view of the same, partly in dotted lines, intended more particularly to show a modified form of the side guides and their arrangement relatively to the rotating back guide in order that the saw shall be supported sidewise not only above the rotating back guide but also below the same as far as the back guide extends in its rear support to the saw. Fig. 3 is a sectional view of the bearings for the rotating back guide. Fig. 4 is a lateral sectional view of the same through the line *a b* of Fig. 3. Fig. 5 is a detached sectional view intended to show the mode of securing the side guides to the guide-block, and Fig. 6 is a section of a modification of the rotating back guide.

The stock or guide block A is supported upon any suitable bar or rod, as usual with band-saw machines; but as shown in the drawings it is supported thereon by means of the slotted arms H cast upon the guide-block. Upon the face of the stock A are the side guides, consisting of the slotted plates C C, connected in any suitable manner—such as by the screws 3 3—that pass through the slots into the spring-cylinder within the stock, and these plates are adjustable nearer to or farther from each other, so as to receive between them the band-saw E, and it is usual to provide a thumb-wheel F and screw G to adjust the parts so that the side guide C C may be moved laterally nearer to or farther from each other to adapt them to any thickness of saw. As in the device described in my said former patent, the rotating back guide employed is in the form of a wheel or roller M, with the peripheral surface thereof slightly concave, so that the diagonal line in which the saw travels may correspond to the said surface of the wheel at the point of contact of the saw, and I also arrange the axis of the rotating wheel M at an inclination to the direction of the band-saw, so that the back of said saw passes diagonally across the periphery of the wheel, and by such movement of the saw in this diagonal line the wheel is caused to revolve, and consequently the point of bearing of the wheel against the back edge of the saw is constantly changed to prevent the saw grooving the peripheral surface of the wheel by a continued action at any one place. The arrangement of inclination of the axis of the rotating wheel relatively to the line of movement of the saw is such that the plane in which the latter moves will intersect the axis of the roller near the middle of the roller, as fully described and set forth in said patent. In said device, however, the combination and arrangement of the parts was such that the rotating back guide was wholly below the side guides; but I have discovered by experiment that while the saw should be guided sidewise above the rotating back guide, a greater accuracy of guide will also be obtained by extending the side guides downward and arranging them so that the saw will also be guided sidewise over the whole surface of the rotating back guide, as shown in the modification of the side guides C C, delineated in Fig. 2 of the drawings.

Much difficulty has been experienced owing to the rapid rotation of the back guide in keeping the parts from wearing by friction, and to this end I have dispensed with the bearings and its oil-cup, shown in my prior patent referred to, and have substituted a roller-bearing in connection with a specific construction of parts, which obviates the necessity of oiling and prevents wear from friction. These parts are as follows, viz: a projection N is cast upon the lower part of the stock A, and is internally screw-threaded to receive the point of a screw S, Fig. 3, which has upon its end an enlarged knob P, made unusually large to prevent the work striking the rotating wheel. The shaft upon which the wheel rotates is hollow, internally screw-threaded, and made in two parts $n n$, circumferentially recessed at the point of meeting, so as to form by the two a full hemispherical recess on the periphery, and a like recess or groove is made on the inner surface of the wheel M in order to admit in both recesses a number of metallic spherical balls R. The parts being put in position, the screw S is inserted through the shaft $n n$ and into the internally screw-threaded recess of the extension-piece N, and screwed up tight so that the shaft shall be solid and fixed and the wheel M revolve freely upon the bearing thus formed.

In Fig. 6 is shown a modification of the rotating back guide constructed in three sections 7 8 9, and sustained upon a tubular arbor 10, so that each section may revolve independently of the other, the arbor being supported upon the roller-bearing shaft described and shown in Fig. 3, or upon any other suitable shaft-mounting desired. The advantage of this construction of the rotating wheel in sectional parts is that the sections may be turned to any desired position relatively to each other, and should one become grooved in its surface the pressure of the back of the saw will be taken upon one of the other sections that is not grooved, and thereby the saw will be held in its proper position. The advantage of placing the rotating back guide below and opposite to the lower extended ends of the side guides, and at such an angle thereto that the plane of the movement of the saw will intersect the axis of the wheel near the middle of the wheel is obvious, and as the latter has been fully stated in my prior patent it need not be here repeated.

Having thus described my invention, what I claim as new, and desire to secure by Letters Patent, is—

1. The combination, with the guide-block of a rotating rear guide-wheel supported therefrom and arranged at an inclination of less than a right angle with the saw, of side guides having lower ends extending downward in front of the axis of the rotating wheel and so arranged relatively thereto and the saw that the latter shall be supported sidewise both above the wheel and in front of the same, substantially as described.

2. The combination, with the guide-block provided with projection N, of side guides, a rotating back guide, and a roller-bearing for the latter consisting of the shaft $n n$, spherical balls R, and supporting screw-bar S, extending into said projection N, substantially as described.

3. The combination, with the guide-block provided with projection N and side guides, of a rotating rear guide for the back of the saw consisting of a wheel constructed in two or more independently-rotating sections on a central single bushing, and a roller-bearing for the latter consisting of the shaft $n n$, spherical balls R, and supporting screw-bar S, extending into said projection N, substantially as described.

4. The combination, with the guide-block, of a rotating rear guide for the back of the saw consisting of a wheel constructed in two or more independently-rotating sections upon a central single bushing, means to support said bushing and wheel at an inclination of less than a right angle to the saw, and side guides having lower ends extending downward in front of the axis of the rotating wheel, and so arranged relatively thereto and to the saw that the latter will be supported sidewise both above the wheel and in front of the same, substantially as described.

In testimony whereof I have hereunto affixed my signature this 1st day of November, A. D. 1889.

REUBEN McCHESNEY.

Witnesses:
ANDREW ZANE,
A. T. FENTON.